United States Patent

Beck

[11] Patent Number: 5,673,673
[45] Date of Patent: Oct. 7, 1997

[54] METHOD AND APPARATUS FOR THE HIGH MACH INJECTION OF A GASEOUS FUEL INTO AN INTERNAL COMBUSTION ENGINE

[75] Inventor: Niels John Beck, Bonita, Calif.

[73] Assignee: Servojet Products International, San Diego, Calif.

[21] Appl. No.: 641,225

[22] Filed: Apr. 30, 1996

[51] Int. Cl.⁶ .................................................. F02M 21/04
[52] U.S. Cl. .................................................. 123/527
[58] Field of Search .................................. 123/525, 526, 123/527, 27 GE

[56] References Cited

U.S. PATENT DOCUMENTS

| | | | |
|---|---|---|---|
| 4,716,879 | 1/1988 | Takayama et al. | 123/590 |
| 4,742,801 | 5/1988 | Kelgard | 123/27 |
| 4,865,001 | 9/1989 | Jensen | 123/525 |
| 5,094,210 | 3/1992 | Endres et al. | 123/432 |
| 5,150,690 | 9/1992 | Carter et al. | 123/527 |
| 5,150,691 | 9/1992 | Imajo | 123/531 |
| 5,201,299 | 4/1993 | Kong | 123/527 |
| 5,203,305 | 4/1993 | Porter et al. | 123/527 |
| 5,237,981 | 8/1993 | Polletta et al. | 123/527 |
| 5,379,740 | 1/1995 | Moore et al. | 123/27 GE |
| 5,398,657 | 3/1995 | Press et al. | 123/527 |
| 5,408,967 | 4/1995 | Foster | 123/27 GE |
| 5,408,978 | 4/1995 | Davis | 123/527 |
| 5,450,829 | 9/1995 | Beck | 123/435 |
| 5,477,830 | 12/1995 | Beck et al. | 123/470 |
| 5,487,371 | 1/1996 | Beckman et al. | 123/572 |
| 5,509,394 | 4/1996 | Hitomi et al. | 123/570 |
| 5,517,978 | 5/1996 | Yi | 123/585 |

FOREIGN PATENT DOCUMENTS

| | | | |
|---|---|---|---|
| 8600611 | 10/1987 | Netherlands | 123/527 |
| 2263309 | 7/1993 | United Kingdom | 123/527 |

OTHER PUBLICATIONS

Development of Multi Point CNG Metering Technology Presented at: Metha Motion 1993 European Conference on Natural Gas Vehicles, Ir. Servaas A.M. Jaasma, 1992.

*Primary Examiner*—Erick R. Solis
*Attorney, Agent, or Firm*—Nilles & Nilles, S.C.

[57] ABSTRACT

A gaseous fuel injection system for a cylinder of an internal combustion engine assures uniform mixing of the gaseous fuel with an air stream being inducted into the cylinder by injecting the gaseous fuel into the air stream at a relatively high velocity, preferably of between a Mach number of 0.5 and a Mach number of 1.0. High Mach injection can be achieved in a remarkably simple and effective manner by 1) using a single or at most a few injection conduit(s) and discharge orifice(s) for each intake port as opposed to a configuration having multiple discharge orifices at a single point in the air intake system upstream of the intake manifold, 2) by setting the relative effective flow areas of the injector metering orifice $C_dA1$ and conduit discharge orifice $C_dA2$ such that $C_dA2$ is between 2 and 5 times greater than $C_dA1$, and by 3) setting the gas supply pressure to be more than four times the air intake manifold absolute pressure. The resulting system is not only simpler and less expensive than supply systems having a high number of discharge orifices at a single upstream point, but also provides more uniform mixing and permits pulsating injection so that a stratified fuel charge can be supplied to the cylinders.

20 Claims, 5 Drawing Sheets

METHOD AND APPARATUS FOR THE HIGH MACH INJECTION OF A GASEOUS FUEL INTO AN INTERNAL COMBUSTION ENGINE

BACKGROUND OF THE INVENTION

1. Field of the Invention

The invention relates to internal combustion engines and, more particularly, to a method and apparatus for injecting a gaseous fuel at a velocity on the order of Mach 1 into an air stream flowing into an intake port of an internal combustion engine thereby to promote mixing and stratification.

2. Discussion of the Related Art

Recent years have seen an increased demand for the use of gaseous fuels as a fuel source in both compression ignition and spark ignition engines. Gaseous fuels such as propane or natural gas are considered by many to be superior to diesel fuel and other compression ignited fuels and to gasoline and other spark ignited fuels because gaseous fuels are generally less expensive, provide equal or greater power with equal or better mileage, and produce significantly lower emissions. This last benefit renders gaseous fuels particularly attractive because recently enacted and pending worldwide regulations may tend to prohibit the use of diesel and other traditional fuels in many engines.

One drawback of gaseous fuels is that, being compressible and of a relatively low density, they are relatively difficult to mix with air streams being inducted into the intake ports of an engine. Prior art systems attempted to enhance mixing through a type of multi-point injection which involved the induction of a gaseous fuel at essentially atmospheric pressure into a point upstream of the intake manifold through multiple orifices spaced around the intake point. The prevailing theory was that supplying gas at many different circumferential locations in this manner would enhance mixing. However, this type of multi-point injection was only partially successful because increasing the number of injection points necessarily decreased the velocity of each individual gas stream entering the air stream. The relatively low density gas, lacking insufficient inertia to penetrate a significant depth into the air stream, therefore would be drawn along the walls of the intake duct and into the cylinder without completely mixing with the incoming air.

This problem has been partially alleviated through the advent of compressed natural gas (CNG) injectors which inject natural gas into the nozzle grid at a relatively high pressure (on the order of 8 bar) and which therefore inject gas into the air stream at a higher velocity than in fumigated or carbureted systems. However, when used in a multi-point injection system having multiple orifices per intake point, the system is typically not configured for high velocity injection, and the velocity of gas entering the air stream is still too low for vigorous mixing.

Mother problem associated with most traditional gaseous fuel supply systems is that they result in little or no stratification. A stratified fuel charge exists within a cylinder when a region of an air/fuel mixture is surrounded by a region of essentially pure air. Stratified charge injection is highly desirable because combustion can be optimized under virtually any engine operating condition if the air/fuel ratio of that portion of the charge is optimized for combustion. Optimum air/fuel ratios might not be achieved absent this stratification. For instance, in an unthrottled engine, a uniform volume of air is drawn into the cylinder during each combustion cycle regardless of engine load. Under idle or light load conditions, a relatively small volume of fuel is mixed with the air. In the absence of stratification, the mixture in the cylinder would be excessively lean, leading to incomplete combustion and emissions of unburnt or partially burnt fuel. This problem can be alleviated through stratified fuel injection by forming in the cylinder a relatively small region of an air/fuel mixture which is neither too rich nor too lean and which is surrounded by a region of essentially pure air.

The formation of a local charge of optimum air/fuel ratio is difficult or impossible in traditional gas supply systems because gas flow to the engine is continuous rather than pulsating. That is, gas flow cannot be turned on and off at will during fueling because the low mass flow rates of the fuel requires constant flow for prolonged periods to obtain the required volume of fuel in the cylinder. Accordingly, the entire charge within the cylinder contains both fuel and air, which might not be mixed at the optimum air/fuel ratio. This problem can be alleviated through the use of a throttle, but only by increasing efficiency losses associated with throttling pressure drop.

The innovation of lambda control by skip fire is also applicable for additional control of the air to fuel ratio. Lambda control by skip fire is described in copending and commonly assigned allowed U.S. patent application Ser. No. 08/491,275, filed Jun. 16, 1995 (now U.S. Pat. No. 5,553, 575), the subject matter of which is hereby incorporated by reference in its entirety.

Still another problem associated with multi-point injection systems having multiple discharge orifices per intake point is that they are relatively complicated and expensive to manufacture and install because a relatively high number of passages and orifices are required.

OBJECTS AND SUMMARY OF THE INVENTION

It is therefore a first primary object of the invention to provide an improved method of mixing uniformly a charge of a gaseous fuel with air in the cylinder of an internal combustion engine.

A secondary object of the invention is to provide a method which meets the first primary object of the invention and which is relatively simple and inexpensive to implement.

In accordance with a first aspect of the invention, this object is achieved by providing a method comprising opening the intake port to admit a stream of combustion air into the cylinder, and simultaneously injecting a gaseous fuel into the stream of combustion air with the gaseous fuel velocity above Mach 0.3, preferably at a velocity of about between about Mach 0.5 and about Mach 1.0.

Preferably, the injecting step comprises 1) ejecting the gaseous fuel from an orifice of a gaseous fuel injector into a supply conduit, the gaseous fuel injector orifice having an effective flow area $C_dA1$, and then 2) ejecting the gaseous fuel from a discharge orifice of the supply conduit into the stream of combustion air, the discharge orifice having an effective flow area $C_dA2$, the area $C_dA2$ being between 2 and 5 times larger than the area $C_dA1$.

Another secondary object of the invention is to provide a method which meets the first primary object of the invention while producing a highly stratified overall charge with a local charge of uniformly mixed air and fuel surrounded by another charge of pure air.

In accordance with another aspect of the invention, this object is achieved by controlling the admitting step to take place during a first period and the injecting step to take place during a second period which is shorter than and fully contained by the first period.

A second primary object of the invention is to provide an improved gaseous fuel injection system for an internal combustion engine which achieves uniform mixing of gaseous fuel and air in the engine's cylinders.

Another secondary object of the invention is to provide a gaseous fuel injection system which meets the first primary object of the invention and which is relatively simple and inexpensive to fabricate, install, and operate.

In accordance with another aspect of the invention, these objects are achieved by providing an internal combustion engine comprising a cylinder having an intake port, an intake valve which selectively and alternately opens and closes the intake port, an air intake manifold communicating with the intake port, and a gaseous fuel injection system. The gaseous fuel injection system comprises a gaseous fuel injector having a metering orifice which has an effective flow area $C_dA1$, and a supply conduit having an inlet connected to the metering orifice of the gaseous fuel injector and having a discharge orifice in fluid communication with the intake port. The supply conduit is the sole conduit for the conveyance of the gaseous fuel from the metering orifice to the intake port. The discharge orifice has an effective flow area $C_dA2$ which is less than 7 times larger than the area $C_dA1$, preferably between 2 and 5 times larger than the area $C_dA1$.

In order to permit stratified fuel injection to be obtained, means are preferably provided for opening the intake valve for a first period, and additional means are provided for causing the injector to inject a gaseous fuel pulse having a second period which is shorter than and fully contained by the first period.

A particularly simple mounting configuration comprises 1) an adapter ring bolted to the engine between the intake port and the air intake manifold, and 2) an injector support block mounted on the adapter ring. The supply conduit is formed by mating passageways formed in the adapter ring and the injector support block.

These and other objects, features, and advantages of the present invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit therefore, and the invention includes all such modifications.

BRIEF DESCRIPTION OF THE DRAWINGS

A preferred exemplary embodiment of the invention is illustrated in the accompanying drawings in which like reference numerals represent like parts throughout, and in which.

DETAILED DESCRIPTION OF THE PREFERRED EMBODIMENT

1. Resume

Pursuant to the invention, a gaseous fuel injection system is provided for a cylinder of an internal combustion engine which assures uniform mixing of the gaseous fuel with an air stream being inducted into the cylinder by injecting the gaseous fuel into the air stream at a relatively high velocity, preferably of between a Mach number of 0.5 and a Mach number of 1.0. High Mach injection can be achieved in a remarkably simple and effective manner by 1) using a single or at most a few injection conduit(s) and discharge orifice(s) for each intake port as opposed to a configuration having multiple discharge orifices at a single point in the air intake system upstream of the intake manifold, 2) by setting the relative effective flow areas of the injector metering orifice $C_dA1$ and conduit discharge orifice $C_dA2$ such that $C_dA2$ is between 2 and 5 times greater than $C_dA1$, and by 3) setting the gas supply pressure to be more than four times the air intake manifold absolute pressure. The resulting system is not only simpler and less expensive than supply systems having a high number of discharge orifices at a single upstream point, but also provides more uniform mixing and permits pulsating injection so that a stratified fuel charge can be supplied to the cylinders.

2. System Overview

Figure 2:
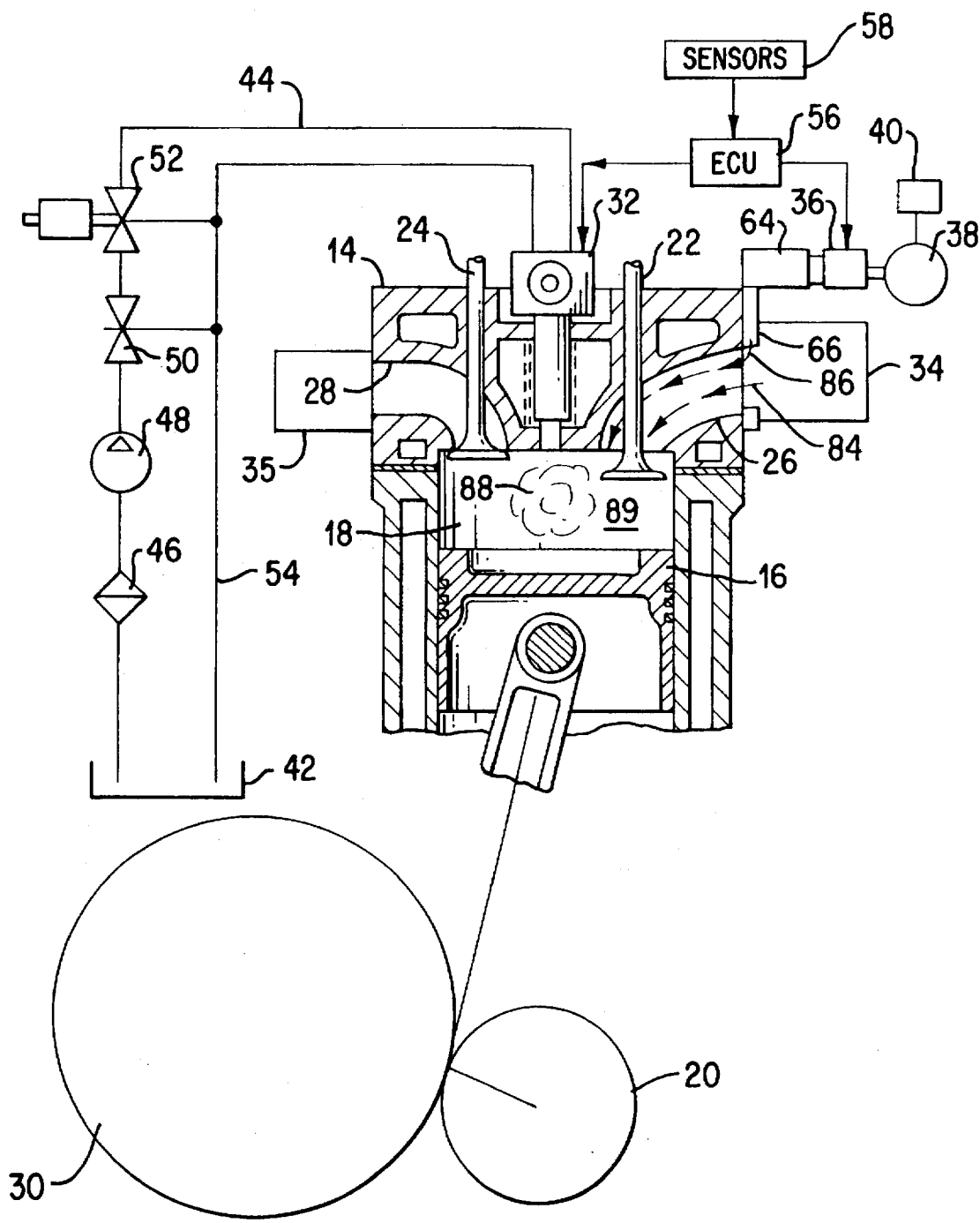
FIG. 2 is a schematic partially cross-sectional end elevation view of a portion of the engine of FIG. 1.

The inventive high Mach injection system is usable with either a compression ignition-type engine or a spark ignition type engine and with either a throttled engine or an unthrottled engine. The illustrated engine 10 is a compression ignition-type unthrottled internal combustion engine having a plurality of cylinders 12 each capped with a cylinder head 14 (FIG. 2). Also as shown in FIG. 2, a piston 16 is slidably disposed in the bore of each cylinder 12 to define a combustion chamber 18 between the cylinder head 14 and the piston 16. Piston 16 is also connected to a crankshaft 20 in a conventional manner. Conventional intake and exhaust valves 22 and 24, disposed at the ends of respective intake and exhaust ports 26 and 28 in the cylinder head 14, are actuated by a standard camshaft 30 so as to control the supply of an air/fuel mixture to and the exhaust of combustion products from the combustion chamber 18. Gases are supplied to and are exhausted from engine 10 via an air intake manifold 34 and an exhaust manifold 35, respectively. However, unlike in many engines, a throttle valve which would normally be present in the intake manifold 34 is absent or at least disabled, thereby producing an "unthrottled" engine 10.

Because the illustrated engine 10 is compression ignited rather than spark ignited, a pilot fuel injection system is required for pilot ignition of the gaseous fuel and includes a plurality of electronically controlled pilot fuel injectors 32. Each pilot fuel injector 32 could comprise any electronically or mechanically controlled injector. Preferably, each injector takes the form of an electro-hydraulic fuel injector, more preferably a pressure-intensified accumulator-type electro-hydraulic unit fuel injector of the type disclosed in U.S. Re. Pat. No. 33,270 to Beck (the Beck '270 patent), the subject matter of which is hereby incorporated by reference in its entirety.

Figure 1:
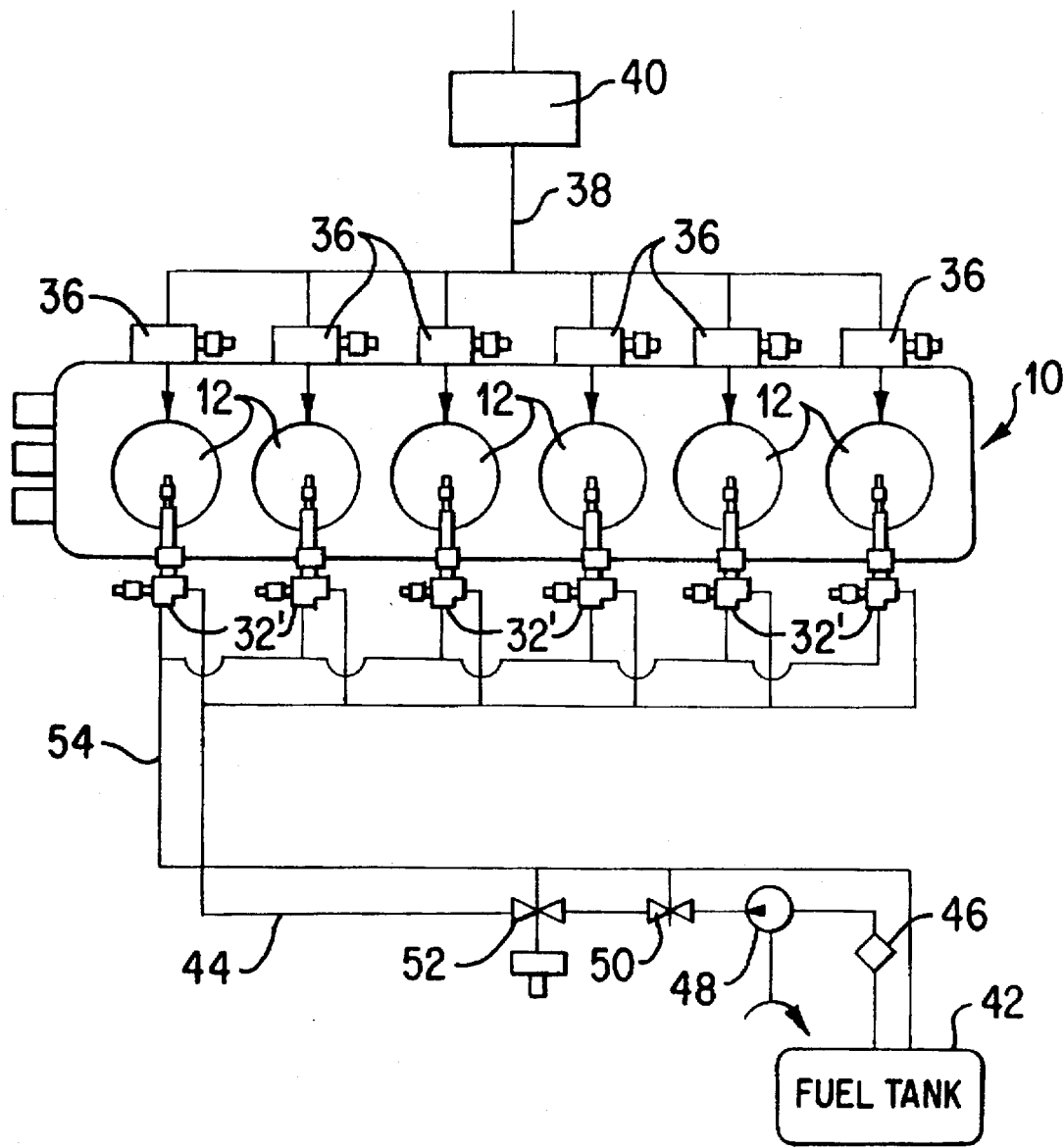
FIG. 1 is a schematic top plan view of an internal combustion engine with which the inventive high Mach injection system can be implemented.

Referring again to both FIGS. 1 and 2, diesel fuel or another liquid fuel ignitable by compression is fed to the injectors 32 from a conventional tank 42 via a common supply line or common rail 44. Disposed in line 44 are a filter 46, a pump 48, a high pressure relief valve 50, and a pressure regulator 52. A common return line or rail 54 also leads from the injectors 32 to the tank 42.

Operation of the injectors 32 is controlled electronically by a computer or electronic control unit (ECU) 56 illustrated schematically in FIG. 2. ECU 56 receives signals from a system of sensors represented collectively by the box 58 in FIG. 2 and transmits output signals to the pilot fuel injectors 32 and to gaseous fuel injectors 36 detailed below. A preferred scheme for the electronic control of electronic fuel injectors to control both pilot fuel injection timing and pilot fuel injection quantity is disclosed in detail in U.S. Pat. No. 5,450,829 to Beck (the Beck '829 patent), the subject matter of which is hereby incorporated by reference in its entirety.

Gaseous fuel is supplied to the engine 10 from a plurality of injectors 36, one of which is provided for each cylinder 12. The construction and operation of the injectors 36 and the manner in which they supply gaseous fuel to the engine 10 will now be detailed.

3. Construction of High Mach Injection System

Figure 3:
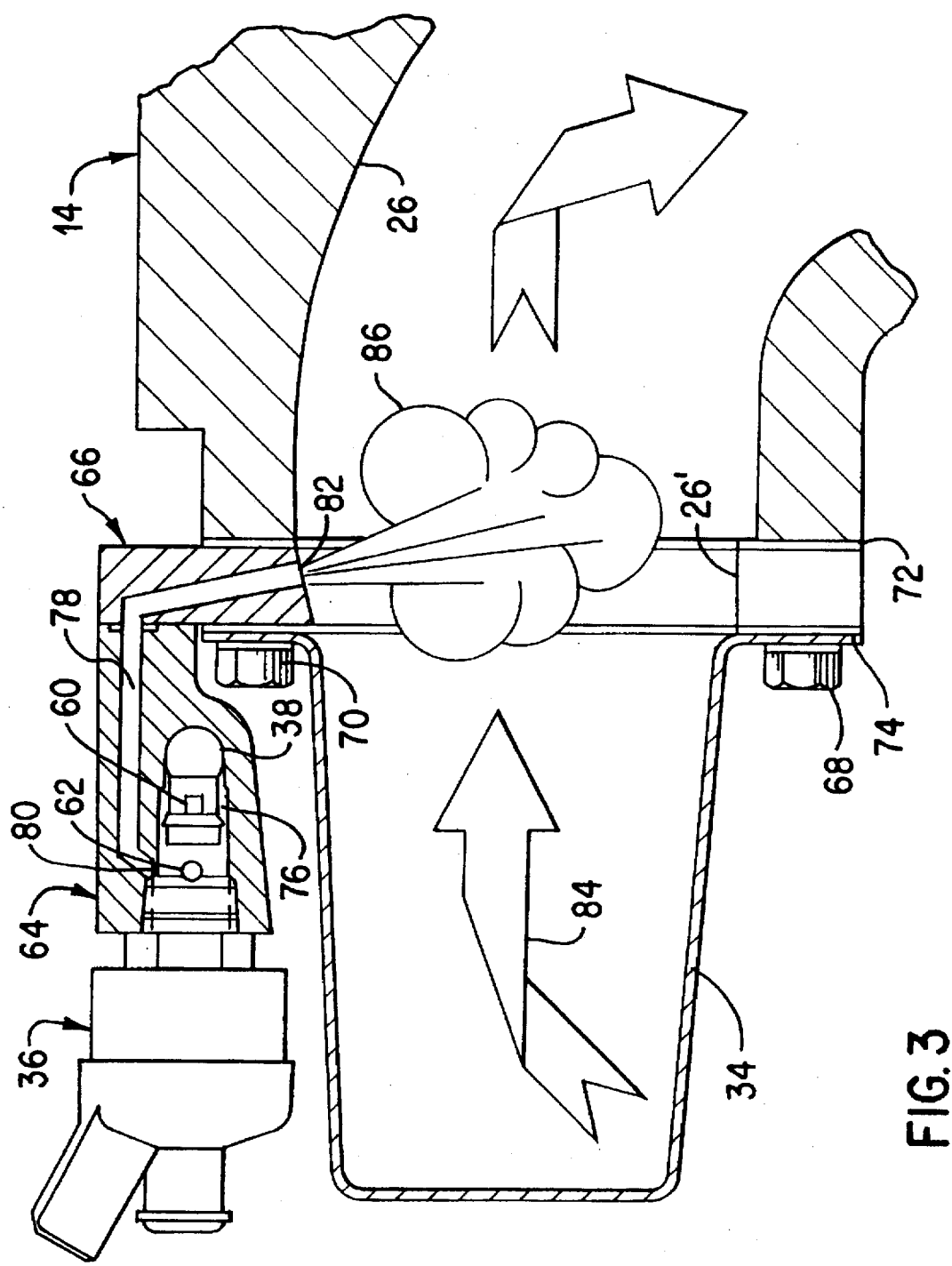
FIG. 3 is a partially cross-sectional end elevation view of a gaseous fuel injector, air intake manifold, and cylinder intake port of the engine of FIGS. 1 and 2.

Referring now to FIGS. 2 and 3, one of the injectors 36 and its connection to the engine 10 will be detailed, it being understood that the description applies equally to all six of the illustrated injectors 36. It should also be understood that although only a single injector 36 is illustrated per cylinder 12, two or more injectors could if desired be provided for each cylinder or for each intake port so long as the effective flow areas $C_dA1$ and $C_dA2$ and Mach numbers detailed below meet design criteria.

Referring now to FIGS. 2 and 3, the injector 36 comprises an electronically controlled injector, preferably an off-the-shelf, electronically-controlled, pulse-width modulated compressed natural gas (CNG) injector which is actuated electronically by the ECU 56. The illustrated injector 36 1) has an inlet orifice 60 receiving natural gas from a gas supply manifold 38 and a compressed gas supply tank 40 and 2) has an outlet or metering orifice 62 located outboard of the inlet orifice 60 and cooperating with a supply conduit as detailed below. The injector 36 is mounted on the engine 12 by a mounting block 64 and an adapter ring 66.

The adapter ring 66 is connected to the cylinder head 14 so as to form an extension 26' of the intake port 26 of the cylinder 12. A separate adapter ring 66 could be provided for each cylinder 12. However, it is preferred that all of the adapter rings be formed from a single plate which 1) extends the length of the engine 10, 2) has six bores formed therein of the same diameter as the intake ports 26, 3) is positioned between the air intake manifold 34 and the engine block forming the cylinder head 14, and 4) is attached to the engine block by the same bolts 68, 70 attaching the air intake manifold 34 to the engine block. Suitable gaskets 72 and 74 are provided between the adapter ring 66 and engine block and between the air intake manifold 34 and the adapter ring 66.

The injector support block 64 is mounted on the upper portion of the adapter ring or plate 66 and extends outwardly from the adapter ring 66 as illustrated in FIG. 3. Six separate support blocks 64 could be provided, one for each CNG injector 36. It is preferred, however, that a single large manifold block 64 be provided having a plurality of relatively large transverse bores 76 formed therein each of which sealingly receives the nozzle portion of a respective CNG injector 36. The gas supply manifold 38 can then be formed longitudinally through the manifold block 64 in the form of a common rail.

A supply conduit is provided for gas flow from the metering orifice 62 of the CNG injector 36 to the intake port 26 of the cylinder 12. In the illustrated and preferred embodiment, this supply conduit is formed from a passageway 78 extending through the support block 64 and the adapter ring 66 so as to have 1) an inlet 80 communicating with the metering orifice 62 and 2) a discharge orifice 82 opening into the intake port extension 26' formed by the adapter ring 66. The passageway 78 preferably has a uniform diameter throughout. However, even if the passageway 78 is tapered or restricted, its discharge orifice 82 should have a cross-sectional area which is no larger than the area of the widest portion of the remainder of the passageway 78. Duplicate passageways could be provided so long as the ratio of the combined area of the discharge orifices 82 to the area of the metering orifice 62 is in the range specified below.

It should be noted at this point that the supply conduit formed by passageway 78 provides a simpler and less expensive connection of the CNG injector 36 to the intake port 26 than is provided by single-point injection systems requiring the provision of a multitude of supply conduits around the periphery of the intake pipe upstream of the intake manifold.

The injector 36 supplies a compressed gaseous fuel such as natural gas or propane from the orifice 62 to the passageway 78 at a relatively high total pressure of about two times the static pressure in the intake port. It has been discovered that use can be made of this high injection pressure and small orifice areas to achieve superior air stream penetration and consequent uniform air/fuel mixing simply by properly setting the effective flow area $C_dA1$ of the sonic flow injector metering orifice 62 relative to that of the effective flow area $C_dA2$ of the supply conduit discharge orifice 82, thereby achieving a very high velocity flow of gaseous fuel into the intake port 26. The inventor has discovered that optimal air stream penetration and consequent mixing occur at gas velocities above Mach 0.3 (the typical peak velocity of airflow into the intake port from the manifold during the intake stroke), preferably of between Mach 0.5 and Mach 1.0. At CNG operating pressures of about 8 bar, the desired high Mach injection and consequent air stream penetration can be achieved by setting the effective flow area $C_dA2$ of the discharge orifice 82 to be less than 7 times the effective flow area $C_dA1$ of the metering orifice 62, and preferably between 2 and 5 times the area $C_dA1$. In the preferred and illustrated embodiment, the metering orifice 62 preferably has an effective area of about 3.18 mm²; and the discharge orifice 82 preferably has an effective area of 6.36 mm² to 15.9 mm². The manner in which high Mach injection is obtained can be understood more readily from a working example. Using compressible adiabatic flow principles, the velocity of gas flowing through an orifice can be obtained using the equation:

$$V = (1000\ Q/\rho A),\ \text{m/sec.} \qquad\qquad \text{Eq. 1}$$

where:

Q = gas flow rate, mg/msec;

ρ = gas density at point of flow, mg/ml;

$C_dA$ = effective cross-sectional flow area at point of flow, mm²;

$C_d$ = flow coefficient; and

A = cross-sectional area, mm$^2$.

Now:

$$\rho = 0.667 \, (P_s)(T_r/T_s), \text{ mg/ml; @1 bar and 20}° \text{ C.;} \qquad \text{Eq. 2}$$

where $P_s$ = static pressure at point of flow, bar;

$T_r$ = dynamic or total temperature at point of flow, °K.; and $T_s$ = static temperature at point of flow, °K.

Accordingly, $$V = (1000 \, Q)/(0.667 \, (P_s)(T_r/T_s))(A)), \text{ m/sec.} \qquad \text{Eq. 3}$$

The relationship $T_r/T_s$ can, if necessary, be calculated according to the equation:

$$T_r/T_s = (P_r/P_s)^{((\gamma-1)/\gamma)}; \qquad \text{Eq. 4}$$

where $Pt = P_s +$ the dynamic or total pressure at the point of flow.

For purposes of this discussion, either natural gas or propane—the gases most likely to be used in the invention—can be approximated as pure methane, which has a γ of 1.31. In this case, Eq. 4 becomes:

$$T_r/T_s = (P_r/P_s)^{(0.237)}. \qquad \text{Eq. 5}$$

The velocity of sound ($V_s$) can be calculated using the equation:

$$V_s = (\gamma g RT)^{0.5}, \text{ m/sec.} \qquad \text{Eq. 6}$$
$$= 446(T_r/293)^{0.5}, \text{ m/sec.}$$

Finally, $$\text{Mach Number, MA} = V/V_s. \qquad \text{Eq. 7}$$

Applying Eqs. 1–7 to a system having a manifold absolute pressure, MAP, of 2 bar; a mass flow rate Q of 4.93 mg/msec, and an effective metering orifice area $C_dA1$ of 3.18 mm$^2$, the Mach number at various locations in the internal combustion engine and under various system parameters are tabulated in Table 1.

TABLE 1

| Parameter | 1 | 2 | 3a | 3b | 3c | 3d |
|---|---|---|---|---|---|---|
| | | | | Location | | |
| $P_t$, bar | 9.5 | 9.5 | 4.74 | 2.49 | 2.30 | 2.08 |
| $P_s$, bar | 9.5 | 4.81 | 2.43 | 2.0 | 2.0 | 2.0 |
| $T_t$, °K. | 293 | 293 | 293 | 293 | 293 | 293 |
| $T_s$, °K. | 293 | 246 | 249 | 276 | 277 | 287 |
| $C_dA1$, mm$^2$ | | 3.18 | 3.18 | 3.18 | 3.18 | 3.18 |
| $C_dA2$, mm$^2$ | | | 6.36 | 12.7 | 15.9 | 31.6 |
| $C_dA2/C_dA1$ | | | 2.0 | 4.0 | 5.0 | 9.9 |
| $P_s$, mg/ml | 6.34 | 3.77 | 1.88 | 1.39 | 1.38 | 1.35 |
| V, m/s | 0 | 411 | 411 | 280 | 223 | 116 |
| $V_s$, m/s | 446 | 411 | 411 | 435 | 435 | 442 |
| M | 0 | 1.0 | 1.0 | 0.64 | 0.51 | 0.26 |

In Table 1:

Location 1 = the gas supply manifold 38;

Location 2 = the gas metering orifice 62; and

Locations 3a–3d = the discharge orifice 82, the ratio $C_dA2/C_dA1$ of which is increased progressively in the Examples a–d from 2 to 9.9 to illustrate the effects in increased discharge orifice area on the Mach number of gas entering the intake port 26, $T_r = 20°$ C.

Table 1 illustrates that a Mach number of 0.51 to 1.0 is obtained so long as the ratio of $C_dA2/C_dA1$ remains less than 5, preferably between 2 and 5, and the gas supply pressure is at least four times the manifold absolute pressure. The effects of this high Mach number on system operation will be detailed in the following Section.

4. Operation of High Mach Injection System

Figure 4:
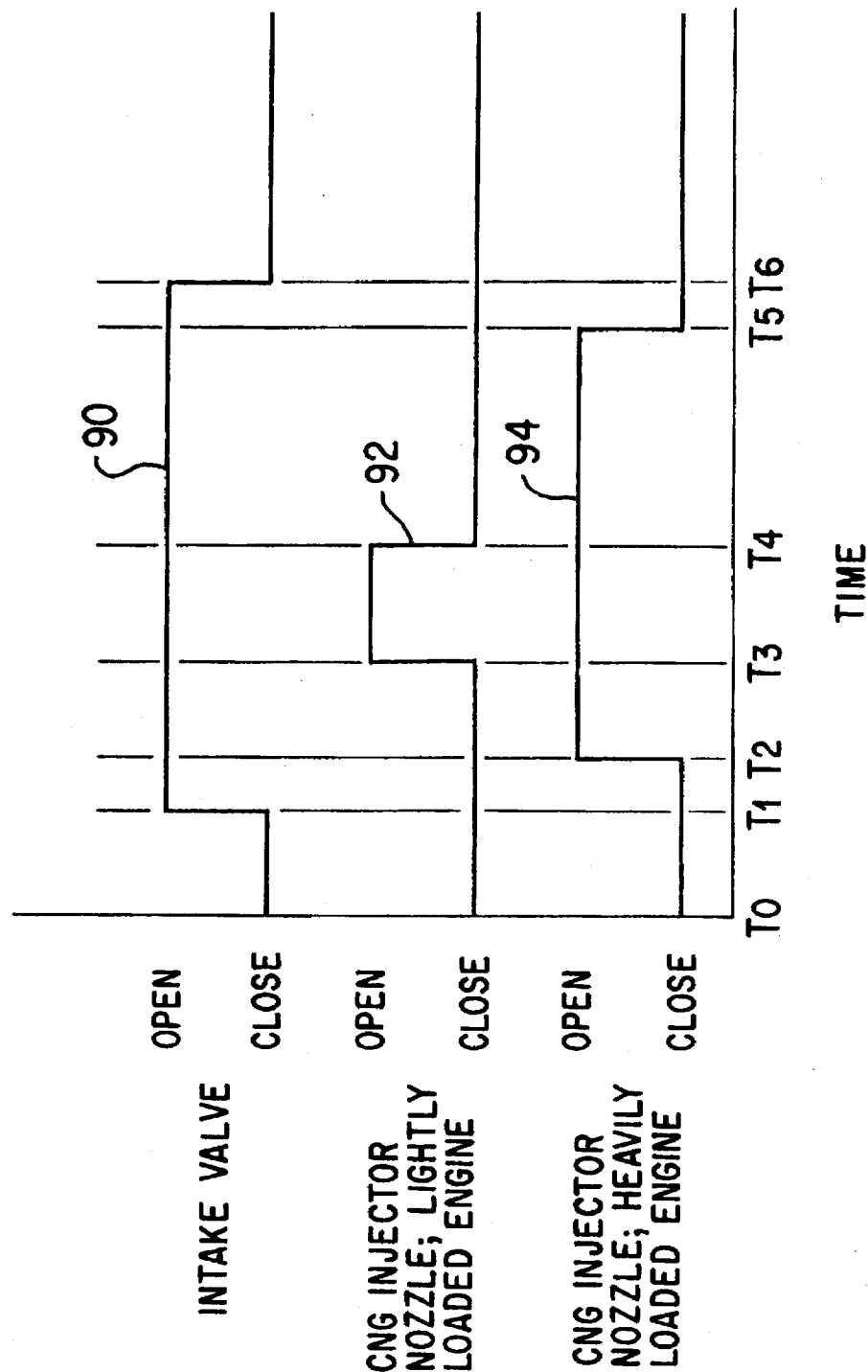
FIG. 4 is a timing chart comparing the period of intake valve opening with the period of injector orifice opening under lightly loaded and heavily loaded engine operating conditions.
Figure 5:
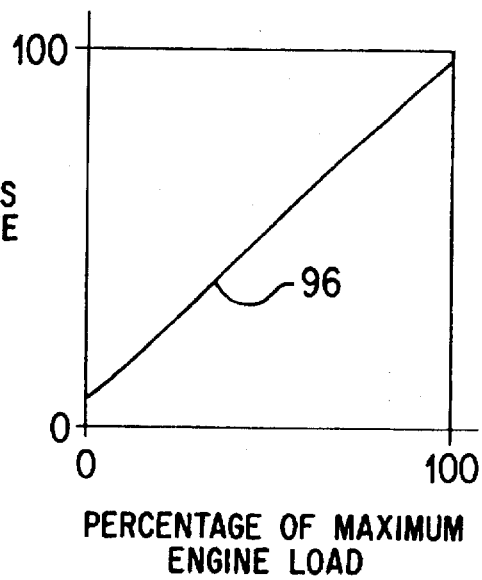
FIG. 5 is a graph illustrating variations in gaseous fuel injection period with variations in engine load.

Referring now to FIGS. 1–5, the illustrated dual fuel compression ignition engine 10 is operated as follows:

First, referring to the curve 90 in FIG. 4, during the intake stroke of the piston 16, i.e., after the exhaust valve 24 closes and the piston 16 begins its downward stroke, the intake valve 22 is opened by the camshaft 30 at time T1 to induct a stream 84 (FIGS. 2 and 3) of air into the chamber 18 through the intake port 26 and the air intake manifold 34. Intake valve 22 closes at time T6 to terminate air induction when a complete air charge has been inducted into the chamber 18.

ECU 56 controls the CNG injector 36 to commence injection of natural gas or the like into the intake port 26 no sooner than the time T1 at which intake valve 22 opens. A plume 86 (FIG. 3) of gaseous fuel is therefore injected into the air stream 84 at a high velocity on the order of Mach 0.5 to Mach 1.

The peak velocity of airflow into the intake port 26 from the manifold 34 during the intake stroke is about 100 m/sec, or about Mach 0.3 at room temperature (493° K.). It has been discovered that airstream penetration and mixing improve substantially when gas is injected into the airstream from the discharge orifice 82 at velocities above about twice this peak velocity or above about Mach 0.5. In the best case fumigated or carbureted system, on the other hand, the total pressure at the injection prot is usually only about 5% higher than the manifold absolute pressure, leading to a Mach number at the discharge orifice of less than 0.3.

A small quantity of pilot fuel is injected directly into the chamber 18 from the injector 32 under the control of ECU 56. The timing and quantity of pilot fuel injection will depend upon prevailing engine operating conditions as detailed in the Beck '829 patent.

Figure 6:
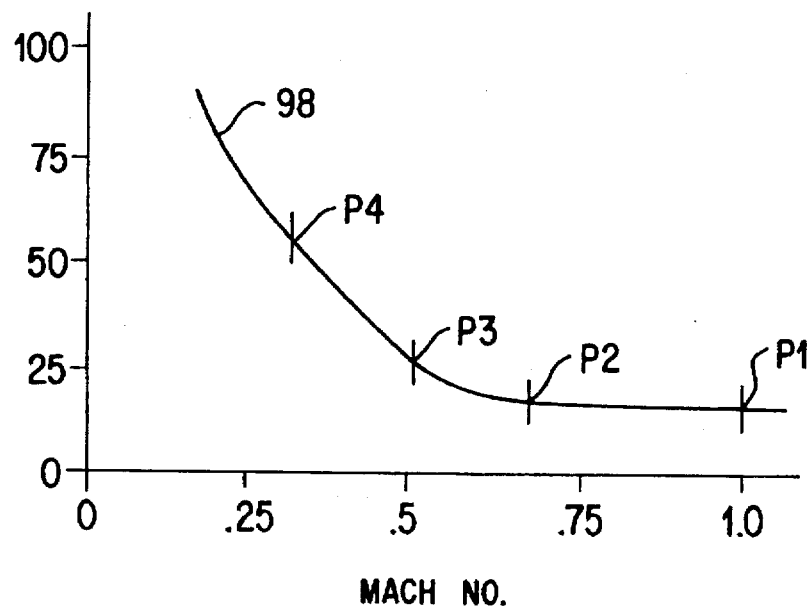
FIG. 6 is a $\Delta T$ vs. Mach No. graph.

The beneficial effects of high Mach injection on engine performance can be appreciated from FIG. 6, the curve 98 of which plots cylinder-to-cylinder variations in exhaust gas temperature (ΔT) with variations in Mach number. These temperature spreads or variations would not exist if an engine were operating perfectly with air and fuel mixed uniformly. However, the point P4 in curve 98 indicates that, during tests of a Cummins Model L10 multi-point injection system having a ratio $C_dA2/C_dA1$ of 9 and a Mach number at the discharge orifices of 0.29 (see Table 1 above), exhaust gas temperature spreads on the order of over 50° C. were observed. When the same engine was fueled by a high Mach injection system that had a ratio $C_dA2/C_dA1$ at or below 5 and that injected fuel into the intake port at a velocity above Mach 0.5, these temperature spreads were much lower—less than 20° C. on average. Points P1–P3 in curve 98 correspond to Mach 1.0, Mach 0.64, and Mach 0.51, respectively, as tabulated in Table 1 above. This decrease in temperature differential provides strong evidence that the advantages of high Mach injection are indeed real.

It is noteworthy that the results described above also demonstrated the "time window" effect of FIG. 4. The beneficial effects of controlling injection pulse duration and frequency to assure injection during the intake stroke of a Cummins L10 and other so-called "shared port" systems are described at length in commonly assigned U.S. Pat. No. 5,477,830, which issued Dec. 26, 1995. The subject matter of this earlier patent is hereby incorporated by reference in its entirety.

Use of a CNG injector 36 and the inventive high Mach injection system permits the pulsed injection of gaseous fuel and consequent stratification. The amount of gaseous fuel injected in each pulse as .a percentage of the total air charge inducted into the chamber 18 will vary proportionally and generally linearly with variations in engine load as represented by the curve 96 in FIG. 5. Referring initially to the curve 92 in FIG. 4, when the engine 10 is only slightly loaded, the period of natural gas injection T3–T4 can be relatively short when compared with the period of intake valve opening T1–T6 and preferably is fully contained within the period T1–T6. Injection in accordance with this scheme would result in the formation of a relatively small charge 88 (FIG. 3) of uniformly mixed fuel and air surrounded by a much larger charge 89 of pure air. If, on the other hand, the engine 10 is heavily loaded and more gaseous fuel is required, the CNG injector 36 is open for a much longer period T2–T5 as illustrated by the curve 94 in FIG. 4. However, because the period of induction of an air/fuel mixture is still surrounded by periods T1–T2 and T5–T6 of induction of pure air, a stratified charge is still produced. The charge of the air/fuel mixture simply would be much larger than the charge 88 illustrated in FIG. 2.

It can therefore be seen that the invention provides a remarkably simple and effective mechanism of 1) thoroughly mixing gaseous fuel with air as the fuel and air are being drawn towards the combustion chamber 18, 2) injecting the entire gas charge into the chamber 18 in a very short period thereby to obtain a high degree of stratification in the overall charge.

Many changes and modifications could be made to the present invention while not departing from the spirit thereof. The scope of these changes will become apparent from the appended claims.

I claim:

1. A method of fueling an internal combustion engine having a cylinder having an intake port formed therein, said method comprising:
   (A) opening said intake port to admit a stream of combustion air into said cylinder, said stream of combustion air flowing at a velocity which peaks while said intake port is open; and
   (B) injecting a gaseous fuel into said stream of combustion air at a velocity above said peak velocity, said gaseous fuel being injected into said stream of combustion air at a location that is sufficiently close to said cylinder to assure that said gaseous fuel enters said intake port at a velocity above said peak velocity.

2. A method as defined in claim 1, wherein said peak velocity is about Mach 0.3, and the injecting step comprises injecting said gaseous fuel into said stream of combustion air from a single port at a velocity of above about Mach 0.3.

3. A method as defined in claim 2, wherein the injecting step comprises injecting said gaseous fuel into said stream of combustion air from a single port at a velocity of between Mach 0.5 and about Mach 1.0.

4. A method as defined in claim 1, wherein the injecting step comprises 1) ejecting said gaseous fuel from an orifice of a gaseous fuel injector into a supply conduit, said orifice having an effective flow area $C_dA1$, and then 2) ejecting gaseous fuel from a discharge orifice of said supply conduit into said stream of combustion air, said discharge orifice having an effective flow area $C_dA2$, said area $C_dA2$ being between 2 and 5 times larger than said area $C_dA1$.

5. A method as define in claim 1, further comprising terminating gaseous fuel injection and then closing said intake port.

6. A method as defined in claim 1, wherein the combustion air is admitted into said intake port during a first period and the injecting step takes place during a second period which is shorter than and fully contained by said first period.

7. A method as defined in claim 6, wherein a duration of said second period varies proportionally and generally linearly with variations in engine load.

8. A method as defined in claim 1, wherein said gaseous fuel is injected directly into a portion of said intake port formed by an adapter ring mounted on said cylinder and located between said air intake manifold and said cylinder.

9. A method of fueling an unthrottled internal combustion engine having a cylinder, an intake port disposed in said cylinder, an intake valve disposed in said intake port, an air intake manifold opening into said intake port, and a compressed gaseous fuel injector, said method comprising:
   (A) opening said intake valve to open said intake port; then
   (B) drawing a stream of combustion air through said intake port and into said cylinder from said nix intake manifold;
   (C) while said intake port is open and said stream of combustion air is flowing into said cylinder, injecting a pulse of gaseous fuel into said intake port from a single port at a velocity above Mach 0.3, thereby creating a charge of a highly mixed air/fuel mixture within said airstream; then
   (D) closing said intake valve to terminate flow into said cylinder, wherein the drawing step takes place during a first period and the injecting step takes place during a second period which is shorter than and fully contained by said first period, whereby a highly stratified charge is admitted into said cylinder with that portion of said charge which contains said gaseous fuel comprising a uniform mixture of said fuel and combustion air.

10. A method as defined in claim 9, wherein the injecting step comprises injecting said gaseous fuel into said intake port at a velocity of between about Mach 0.5 and about Mach 1.0.

11. A method as defined in claim 9, wherein the injecting step comprises 1) ejecting said gaseous fuel from a metering orifice of a gaseous fuel injector into a supply conduit, said motoring orifice having an effective flow area $C_dA1$, and then 2) ejecting said gaseous fuel from a discharge orifice of said supply conduit into said intake port, said discharge orifice having an effective flow area $C_dA2$, said area $C_dA2$ being between 2 and 5 times larger than said area $C_dA1$.

12. A method as defined in claim 9, wherein a duration of said second period varies proportionally and generally linearly with variations in engine load.

13. A method as defined in claim 9, wherein gas is supplied by said injector at a pressure which is at least four times manifold absolute pressure.

14. An internal combustion engine comprising:
   (A) a cylinder having an intake port formed therein;
   (B) an intake valve which selectively and alternately opens and closes said intake port;
   (C) an air intake manifold communicating with said intake port;
   (D) a gaseous fuel injector having a metering orifice which has an effective flow area $C_dA1$; and
   (E) a supply conduit having an inlet connected to said metering orifice of said gaseous fuel injector and having a discharge orifice in direct fluid communication with said intake port, said supply conduit being the sole conduit for the conveyance of said gaseous fuel from said metering orifice to said intake port, said discharge orifice having an effective flow area $C_dA2$ which is less than 7 times larger than said area $C_dA1$.

15. An apparatus as defined in claim 14, wherein said area $C_dA2$ is between 2 and 5 times larger than said area $C_dA1$.

16. An apparatus as defined in claim 14, further comprising means for opening said intake valve for a first period; and means for causing said injector to inject a gaseous fuel pulse having a second period which is shorter than and fully contained by said first period.

17. An apparatus as defined in claim 16, further comprising means for varying a duration of said second period proportionally and generally linearly with variations in engine load.

18. An apparatus as defined in claim 16, wherein said engine is a dual fuel engine, and further comprising a pilot fuel injector having an injection nozzle in fluid communication with said cylinder, and means for controlling said pilot fuel injector to inject a pulse of liquid pilot fuel into said cylinder.

19. An apparatus as defined in claim 14, further comprising an adapter ring bolted to said engine between said intake port and said air intake manifold and having an opening formed therein which forms an extension of said intake port, and an injector support block mounted on said adapter ring, wherein said supply conduit is formed by mating passageways formed in said adapter ring and said injector support block.

20. An apparatus as defined in claim 14, wherein said engine is an unthrottled engine.

* * * * *

UNITED STATES PATENT AND TRADEMARK OFFICE
CERTIFICATE OF CORRECTION

PATENT NO. : 5,673,673
DATED : October 7, 1997
INVENTOR : Neils John Beck

It is certified that error appears in the above-identified patent and that said Letters Patent is hereby corrected as shown below:

Column 1, line 55, delete "Mother" and insert --Another--;

Column 6, line 60 delete "$_d$" and insert -- $\rho$ --;

Column 10, line 23, delete "nix" and insert --air--;

Column 9, line 8, delete the period after "as".

Signed and Sealed this

Third Day of March, 1998

Attest:

BRUCE LEHMAN

*Attesting Officer*   Commissioner of Patents and Trademarks